United States Patent [19]
Koop

[11] Patent Number: 4,751,720
[45] Date of Patent: Jun. 14, 1988

[54] CUBE CORNER POLARIZER

[75] Inventor: Dale E. Koop, Sunnyvale, Calif.

[73] Assignee: Spectra-Physics, Inc., San Jose, Calif.

[21] Appl. No.: 34,342

[22] Filed: Apr. 3, 1987

[51] Int. Cl.[4] ............................................. H01S 3/08
[52] U.S. Cl. ..................................... 372/99; 372/106;
372/107; 372/108; 372/93; 372/27
[58] Field of Search ................ 372/106, 107, 108, 99,
372/27, 93

[56] References Cited
U.S. PATENT DOCUMENTS

| | | | |
|---|---|---|---|
| 3,995,230 | 11/1976 | See | 372/93 |
| 4,050,035 | 9/1977 | Wuerker et al. | 372/93 |
| 4,099,141 | 7/1978 | Leblanc et al. | 372/93 |
| 4,292,602 | 9/1981 | Berqvist | 372/94 |
| 4,677,639 | 6/1987 | Sasser | 372/108 |

OTHER PUBLICATIONS

Taylor, "Compound TIR Prism for Polarization-Selective Laser Resonators", Opto. Electronics 5, (1973), pp. 255–256.

*Primary Examiner*—Leon Scott, Jr.
*Attorney, Agent, or Firm*—Donald C. Felix; Paul Davis

[57] ABSTRACT

A method and apparatus for producing preferential polarization of the output light beam from a laser of the kind having a three surface retroreflector comprises mounting the three reflecting surfaces of the retroreflector so that the surfaces are orthogonal in the retroreflector. The preferential polarization is obtained by controlling the combined effects of the orientation of the retroreflector assembly, with respect to the axis of the beam, and the selection of the coatings on the three reflecting surfaces.

22 Claims, 3 Drawing Sheets

SUBSTRATE REFLECTIVITY
Rs VS. Rp

REFLECTIVITY VS. ANGLE
SILVER AT 10.6 MICRONS

CUBE CORNER POLARIZER

BACKGROUND OF THE INVENTION

This invention relates to a laser of the kind having a three-surface retroreflector.

The invention relates particularly to methods and apparatus for producing preferential polarization of the output light beam from a laser of the kind having a three-surface retroreflector.

When the output beam of a laser is used for cutting, the output light beam needs to be linearly polarized. This is an application's requirement. Linearly polarized light comes out at 45 degrees and is put through a quarter wave plate which makes circularly polarized light so that the light beam can cut steel or metal in both the X and Y directions with equal efficiency.

If the output light beam is randomly polarized, the light beam will produce different cut qualities when cutting contours.

By circularly polarizing the light, the same cutting efficiency is obtained no matter what direction the contour is being cut.

To get circularly polarized light, linearly polarized light is used as a starting point and is put through a special optic. So the laser needs to have linearly polarized light coming out of it.

One way of producing linearly polarized light at the output of a laser is to use a fold mirror mounted at 45 degrees within the path of the light beam resonating in the laser cavity. This produces polarization because the S and P reflectivities are enough different to cause the light to go into one mode, which is the highest efficiency, the least losses. In this polarization mode the polarization vector is in the plane of the maximum reflection of the S and P reflectivities.

Using an extra mirror in association with the laser cavity in this way requires extra structure and involves greater optical complexity because of the addition of the extra mirror.

SUMMARY OF THE INVENTION

It is a primary object of the present invention to produce preferential polarization of the output light beam from a laser of the kind having a three-surface retroreflector in a way that avoids the problems and complexity of methods and apparatus used in the prior art.

It is a related, important object of the present invention to obtain preferential polarization of the output light beam from a laser of the kind having a three-surface retroreflector without having to use an extra mirror.

In the method and apparatus of the present invention preferential polarization is produced by mounting three reflecting surfaces of a retroreflector so that the surfaces are orthogonal in the retroreflector assembly.

The preferential polarization is obtained by controlling the combined effect of the orientation of the retroreflector assembly with respect to the axes of the laser beam and the selecting of coatings on the three reflecting surfaces.

In a preferred embodiment of the present invention the retroreflector or cube corner is oriented in a symmetrical fashion such that the angle of incidence of light at each reflecting surface is identical and is approximately 54.6 degrees. Two of the reflecting surfaces are enhanced with dielectric layers such that their differential reflectivities are minimized. The surface of the third reflecting surface is coated such that its differential reflectivity is maximized and is significantly different from the other two reflecting surfaces.

In a specific embodiment for a carbon dioxide laser silicon substrate mirrors are used and each mirror has a reflecting layer of silver. Two of the mirrors are enhanced with layers of ZnSe, and all three are protected with ThF coatings. The enhanced mirrors have S and P reflectivities of 0.998 and 0.993, and the third mirror has S and P reflectivities of 0.996 and 0.984 providing a differential reflectivity of about 1 percent, which is enough to preferentially polarize the circulating light and to produce linearly polarized light in the outlet beam of the laser.

The two resonating mirrors are mounted in close proximity and by a common, rigid member so that the combination of the unitary cube corner and resonating mirror mounting system provides optical stability without the need for auxiliary mechanical structure.

Apparatus and methods which incorporate the structures and which are effective to function as described above constitute further, specific objects of the invention.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

DETAILED DESCRIPTION OF THE PREFERRED EMBODIMENTS

Figure 1:
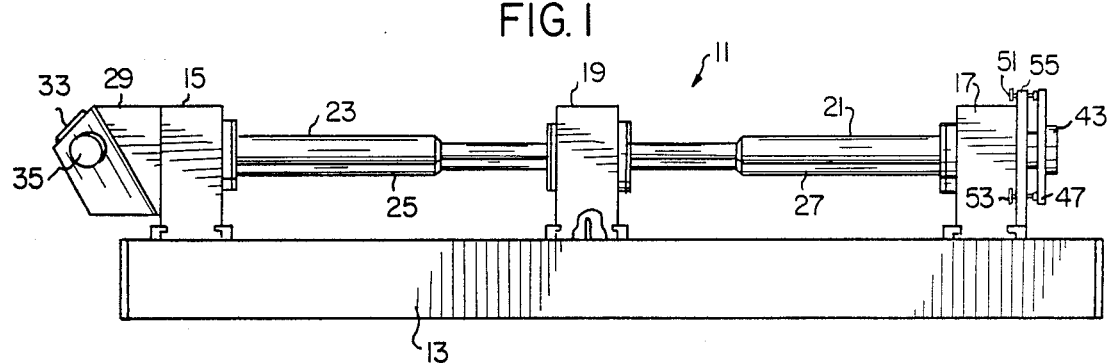
FIG. 1 is a side elevation view of a laser having a three-mirror cube corner structure which provides a folded light path and which incorporates a polarization scheme effective to produce linearly polarized light at the outlet of the laser in accordance with one embodiment of the present invention.

FIG. 1 is a side elevation view of a laser, indicated generally by the reference numeral 11, having a three-mirror cube corner structure which provides a folded light path and which incorporates a polarization scheme effective to produce linearly polarized light at the outlet of the laser in accordance with one embodiment of the present invention.

The laser 11 includes a strong, rigid base support 13 and three mounting blocks 15, 17 and 19 which mount component parts of the active laser on the base 13. The blocks are mounted on the base support 13 by precision bores and related dowel pin structures.

The laser 11 illustrated in FIG. 1 is a flowing gas laser.

In one specific embodiment of the present invention the laser is a carbon dioxide laser having four axial flow tubes 21, 23, 25 and 27.

The carbon dioxide gas flows axially through the tubes 21–27 in the way described in co-pending U.S. application Ser. No. 06/811,593, filed Dec. 19, 1985, by Joseph F. Rando, et al. and entitled FAST AXIAL FLOW LASER CIRCULATING SYSTEM and assigned to the same Assignee as the Assignee of this present application. The laser 11 shown in FIG. 1 is also generally like that shown in pending U.S. application Ser. No. 06/863,632, filed May 14, 1986, by Robert B. Slusher, et al. and entitled FAST AXIAL FLOW CARBON DIOXIDE LASER and assigned to the same Assignee as the Assignee of the present application.

Both of these pending Application Ser. Nos. 06/811,593 and 06/863,632 are incorporated by reference in the present application in accordance with the provisions of Section 608.01(p)B of the *MANUAL OF PATENT EXAMINING PROCEDURE* of the U.S. Patent and Trademark Office.

With continued reference to FIG. 1 the blocks 15 and 17 provide inlet manifolds for conducting flowing gas to the inlet ends of the tubes 21, 23, 25 and 27, and the block 19 provides an exhaust manifold for conducting blowing gas from the outlet ends of the tubes 21–27. The pump or blower and related conduit structure for cooling and circulating the blowing gas is not illustrated in FIG. 1, but is shown in pending application Ser. No. 07/033,093 filed Mar. 31, 1987, by Dale E. Koop et al and entitled RESONATOR MODULE AND BLOWER ASSEMBLY and assigned to the same assignee as the assignee of the present application. This pending application Ser. No. 07/033,093, filed Mar. 31, 1987 by Dale E. Koop et al is also incorporated by reference in the present application in accordance with the provisions of Section 608.011(p)B of the *MANUAL OF PATENT EXAMINING PROCEDURE* of the U.S. Patent and Trademark Office.

A retroreflector or cube corner 29 is mounted on the block 15.

In one specific embodiment the cube corner 29 is mounted on the block 15 by precision bores and related dowel pins.

Figure 2:
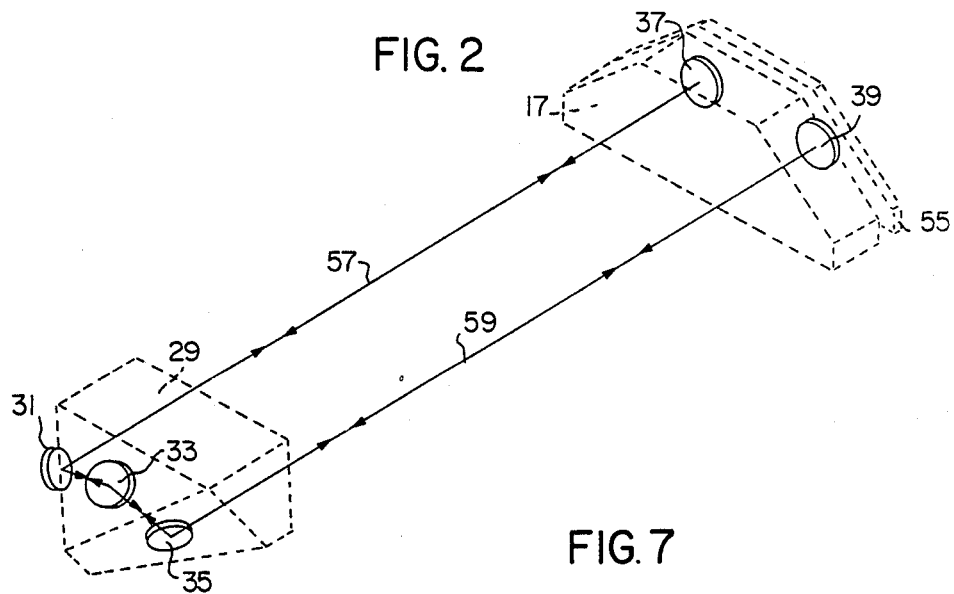
FIG. 2 diagrammatically illustrates the way that the three-mirror cube corner provides a folded light path for the laser shown in FIG. 1.
Figure 3:
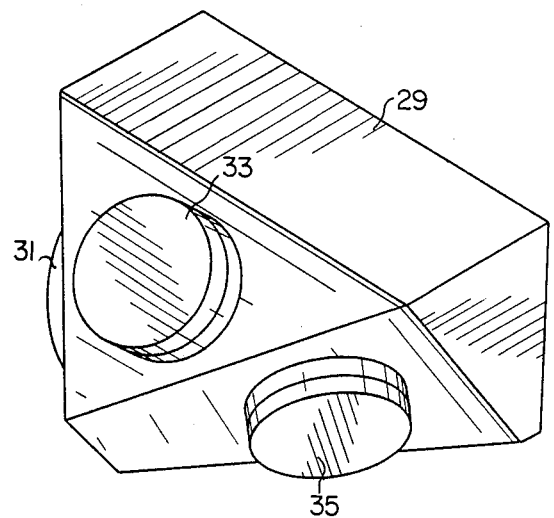
FIG. 3 is an enlarged, isometric view showing details of the end mirrors and related mirror mounting plates for the laser shown in FIG. 1.

As best illustrated in FIGS. 2 and 3, the retroreflector 29 has three reflecting mirrors 31, 33 and 35. The reflecting surfaces of these mirrors are orthogonal.

As will be described in more detail below, the retroreflector 29 can be mounted on the mounting block 15 in a way such that the cube corner is oriented in a symmetrical fashion such as the angle of incidence of light at each reflecting surface is identical and is approximately 54.6 degrees. this is the orientation which is illustrated in FIG. 1.

Alternatively, as will be described in more detail below, the retroreflector or cube corner 29 can be rotated about either its vertical axis or its horizontal axis or about both axes, to cause a difference between the angles of incidence of the light on the respective reflecting surfaces and to cause a resulting preferred polarization of the output light of the laser 11, and is mounted on the block at that orientation.

Figure 4:
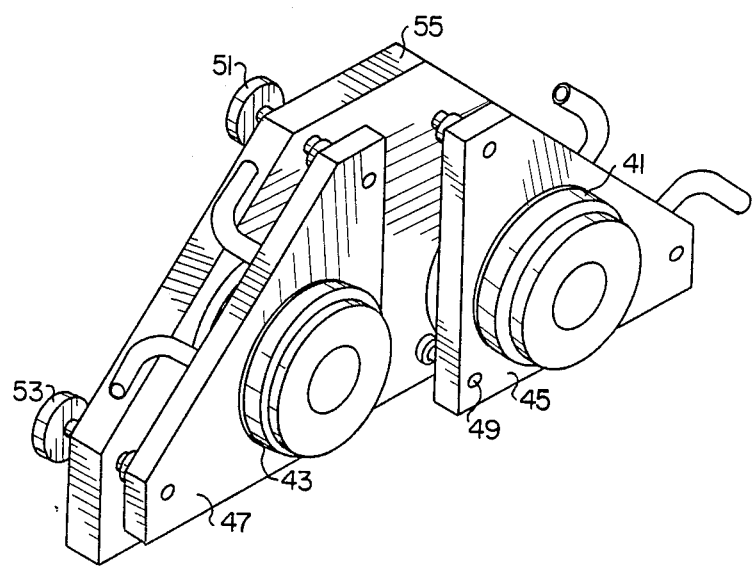
FIG. 4 is an enlarged, isometric view showing details of the end mirrors and related mirror mounting plates for the laser shown in FIG. 1.

As best illustrated in FIGS. 2 and 4, the laser 11 has two end or resonating mirrors 37 and 39 mounted in respective lens mounts 41 and 43. As best shown in FIG. 4, the lens mounts 41 and 43 are installed in tilt plates 45 and 47. Each of the tilt plates 45 and 47 is adjusted by means of a fixed pivot 49 and two adjustment screws 51 and 53. All of the tilt adjustment screws are threaded within a common base plate 55, and the lens mounts 41 and 43 and the associated resonating mirrors 37 and 39 (see FIG. 2) are therefore mounted in close proximity by a common unitary plate 55. This provides excellent optical stabiliy with simple mechanical structure.

As best illustrated in FIG. 2, the retroreflector 29 provides a folded light path having a beam 57 within the tubes 25 and 27 and a beam 59 within the tubes 21 and 23. The two light beams 57 and 59 are maintained parallel by the cube corner 29 and are insensitive to the movement of the cube corner.

The cube corner, in combination with the mounting of the two resonator mirrors by a single plate 55 provide an improved configuration of an optically stable laser cavity. The optical stability is obtained without the need for auxiliary mechanical structure. The cube corner 29, as noted above, maintains the beams 57 and 59 parallel because the laser is insensitive to the movement of the cube corner. The resonator mirrors are maintained parallel to each other by being mounted in close proximity and on the same plate 55. The plate 55 is always at one temperature and is not going to distort.

The present invention is also directed to producing preferential polarization of the output light beam from the laser, and in particular linear polarization. Linearly polarized light, when put through a quarter wave plate, makes circularly polarized light so that the light beam can be used to cut steel or metal in both the X and Y directions with equal efficiency.

If the output light beam is randomly polarized, there will be different cut qualities produced when the light is used to cut contours. By making the light circularly polarized, the same cutting efficiency is produced, no matter what direction is involved in cutting a contour.

The present invention produces preferential polarization of the output light from the laser 11 without the need to use an additional mirror mounted at 45 degrees with respect to the axis of the light beams 57 and 59.

The polarization of reflected light is dependent upon the proportion of light reflected at a mirror surface. The proportion of light reflected at a mirror surface depends on the angle of incidence and upon the orientation of the polarization vector within respect to the plane of incidence. In particular the reflectivity for light polarized within the plane of incidence, (P Polarized) is different than the reflectivity of light polarized normal to the plane (S Polarized). In general all light rays can be considered as superpositions of S and P waves. The total reflectivity will be a function of the superposition. The difference in reflectivity for S and for P waves is the differential reflectivity.

Figure 7:
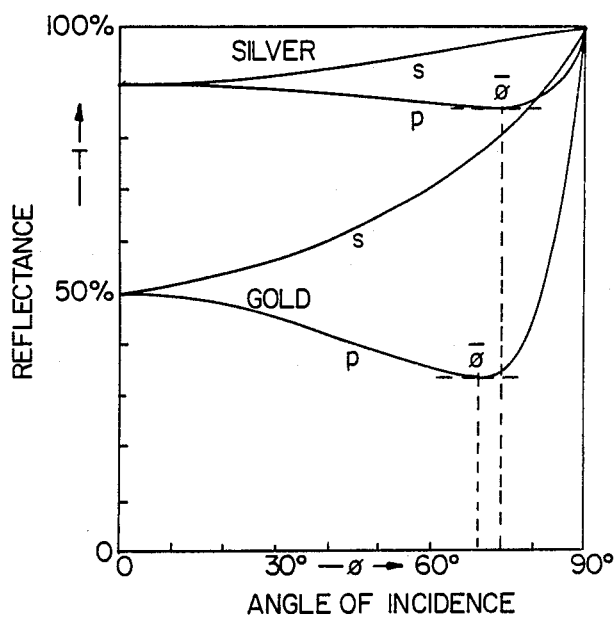
FIG. 7 is a graph showing a relationship of reflectance versus angle of incidence for visible light for mirrors coated with silver and for mirrors coated with gold.
Figure 5:
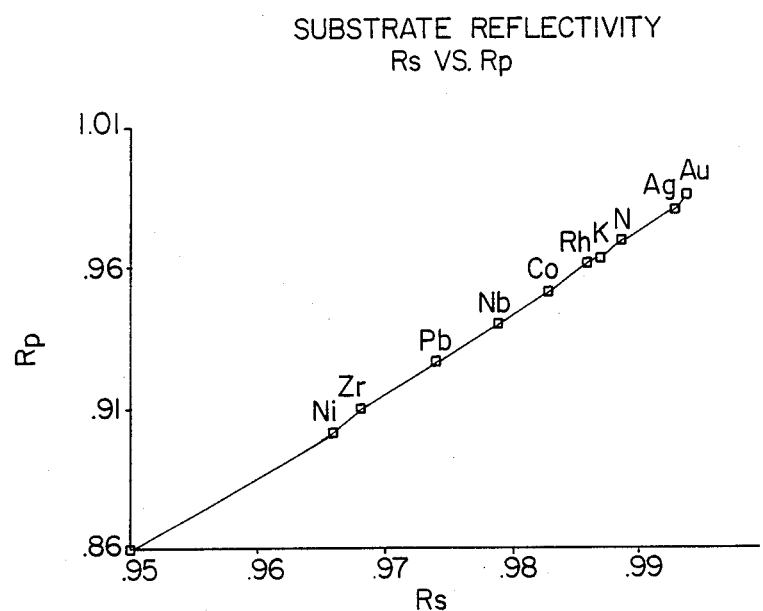
FIG. 5 is a graph showing the relationship of substrate reflectivity for mirrors used in one embodiment of the present invention.
Figure 6:
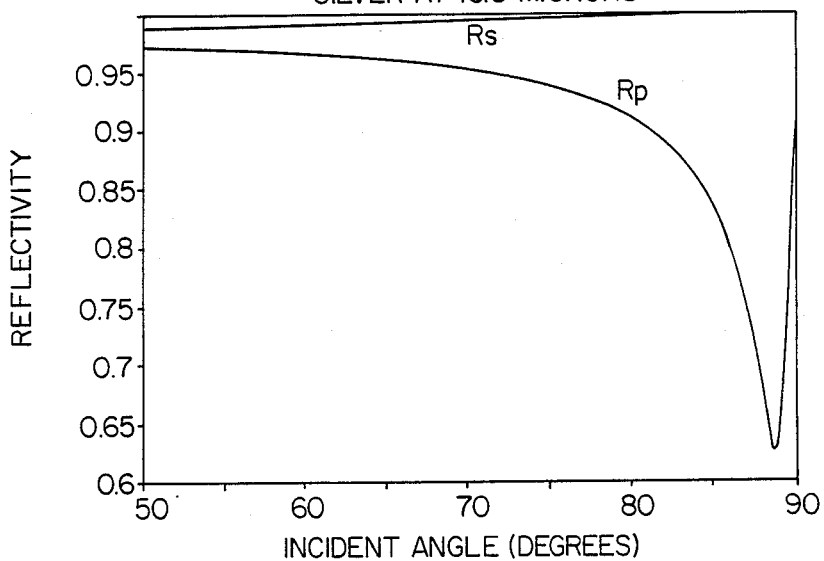
FIG. 6 is a graph showing a relationship of reflectivity versus angle for mirrors used in one embodiment of the present invention.

The differential reflectivity is a function of the angle of incidence and of the material comprising the mirror surface. This is illustrated in FIG. 7 for visible light and for two different materials, silver and gold, comprising the mirror surface. See also FIG. 5 which is a plot of substrate reflectivity or $R_s$ versus $R_p$ for different materials.

See also FIG. 7 which is a plot of reflectivity versus angle for silver at light having a 10.6 microns wavelength.

In a specific preferred embodiment of the present invention, the cube corner 29 is oriented in a symmetrical fashion such that the angle of incidence of light at each surface is identical and is approximately 54.6 degrees. Two of the reflecting surfaces of the mirrors in the cube corner are enhanced with layers of ZnSe, and all three mirrors are protected with ThF coatings. The enhanced mirrors are protected with ThF coatings. The enhanced mirrors have S and P reflectivities of 0.998 and 0.993, and the third mirror has S and P reflectivities of 0.996 and 0.984 providing a differential reflectivity of about 1%, which is enough to preferentially polarize the circulating light.

This produces linearly polarized light in the output light beam of the laser 11.

In another embodiment the cube corner 29 can be oriented (about its horizontal and/or axes,) such that the differential reflectivities of each of the three mirrors 31, 33 and 35 produce an overall differential reflectivity in the laser cavity to cause a preferential polarization of the circulating light.

In summary on the polarization scheme, the orientations of the mirrors and their coatings affect what direction the polarization vector will be, so it is possible to utilize either the orientations of the mirrors or the coatings, or a combination of orientations and coatings, to control that. This can be done in any number of ways as long as the superposition (or combined effect) add up to what is wanted.

In most cases, the practical method is to have two mirrors that are identical with very little polarizing effect and one mirror with the polarizing effect. The polarizing effect can be produced either by position or by coating. The one mirror can then be considered as doing all the work, and the other two mirrors can be considered just to be spectators, so far as producing preferential polarization is concerned.

In the cube corner laser construction shown in FIG. 1, it is usually simpler to make all of the mirror positions of the cube corner symmetrical and to change the coating on one mirror with respect to the coatings on the other two mirrors. Two of the mirrors may, for example, have enhanced coatings which tend to minimize the splitting between the S and P reflectivities, and the third mirror may have a different coating which produces enough splitting between the S and P reflectivities to control the polarization and to produce the polarization in the plane determined by that mirror.

As noted above, the preferential polarization can also be obtained by rotation of the cube corner 29 about either or both its vertical and horizontal axes.

The preferential polarization can also be obtained by a combination of mirror positioning and coatings. The resulting, preferred polarization can be determined by vector algebra by determining the superposition of all the reflectivities. The calculations involved can become complex when the three mirror positions are not symmetrical and can become even more complex when the three mirror positions are not symmetrical and there is also a difference in the coatings.

While I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A method of producing preferential polarization of the output light beam from a laser of the kind having a three surface retroreflector, said method comprising,
    mounting three reflecting surfaces of a retroreflector so that the surfaces are orthogonal in the retroreflector assembly, and obtaining the preferential polarization by controlling the orientation of the retroreflector assembly with respect to the axis of the laser beam and selection of coatings on said three surfaces.

2. The method defined in claim 1 including rotating the retroreflector assembly to a position which causes at least one reflecting surface to have an angle of incidence which is different from the angles of incidence of the other reflecting surfaces to cause the combined effects of the angles of incidence to produce the preferential polarization.

3. The method defined in claim 2 including rotating the retroreflector to a position in which the angles of incidence on two of the reflecting surfaces are substantially the same and the angle of incidence on the third reflecting surface is different enough to cause the third reflecting surface to produce the preferential polarization.

4. The method defined in claim 3 wherein the preferential polarization is linear polarization.

5. The method defined in claim 1 including applying substantially the same coating to two of the reflecting surfaces and applying to the third reflecting surface a coating different enough to cause the third reflecting surface to produce the preferential polarization.

6. The method defined in claim 5 wherein the preferential polarization is linear polarization.

7. The method defined in claim 6 wherein the retroreflector is oriented in a symmetrical way such that he angle of incidence of light at each reflecting surface is identical and approximately 54.6 degrees, two of the reflecting surfaces have coatings such that their S and P differential reflectivities are minimized, and the third reflecting surface has a coating such that its S and P differential reflectivity is maximized and significantly different from the other two reflecting surfaces.

8. The method defined in claim 7 wherein the laser is a carbon dioxide laser, each of the reflection surfaces comprises a layer of silver on a silicon substrate, two surfaces are enhanced with dielectric layers of ZnSe and all three surfaces are protected with ThF coatings, the two enhanced surfaces have S and P reflectivities of 0.998 and 0.993, and the third surface has S and P reflectivities of 0.996 and 0.984 providing a differential reflectivity of about 1% which preferentially polarizes the circulating light.

9. The method defined in claim 1 including both rotating the retroreflector assembly and controlling the selection of coatings on the reflecting surfaces to cause the angles of incidence and the selection of coatings to produce the preferential polarization.

10. The method defined in claim 9 including rotating the retroreflector to a position and selecting the coatings so that one of the three reflecting surfaces controls the polarization.

11. The method defined in claim 10 wherein the preferential polarization is linear polarization.

12. The method defined in claim 1 including mounting two resonating mirrors in close proximity and on a common base plate opposing said retroreflector assembly to provide optical stability.

13. Apparatus for producing preferential polarization of the output light beam from a laser of the kind having a three surface retroreflector, said apparatus comprising, a retroreflector having three reflecting surfaces mounted so that the surfaces are orthogonal in the retroreflector assembly, and polarization means for obtaining the preferential polarization by controlling orientation of the retroreflector with respect to the axis of the laser beam and selection of coatings on said three surfaces.

14. The invention defined in claim 13 wherein the polarization means include rotating means for rotating the retroreflector assembly to a position which causes at least one reflecting surface to have an angle of incidence which is different from the angles of incidence of the other reflecting surfaces causing angles of incidence to produce the preferential polarization.

15. The invention defined in claim 14 wherein the retroreflector is rotated to a position in which the angles of incidence on two of the reflecting mirrors are substantially the same and the angle of incidence on the third reflecting surface is different enough to cause the third reflecting surface to produce the preferential polarization.

16. The invention defined in claim 15 wherein the preferential polarization is linear polarization.

17. The invention defined in claim 13 including coating means for producing coatings on the reflecting surfaces to cause the coatings to produce the preferential polarization.

18. The invention defined in claim 17 wherein the coatings on two of the reflecting surfaces are substantially the same and wherein the third reflecting surface has a coating different enough to cause the third reflecting surface to produce the preferential polarization.

19. The invention defined in claim 18 wherein the preferential polarization is linear polarization.

20. The invention defined in claim 19 wherein the retroreflector is oriented in a symmetrical way such that the angle of incidence of light at each reflecting surface is identical and approximately 54.6 degrees, two of the reflecting surfaces have coatings such that their S and P differential reflectivities are minimized, and the third reflecting surface has a coating such that its S and P differential reflectivity is maximized and significantly different from the other two reflecting surfaces.

21. The invention defined in claim 20 wherein the laser is a carbon dioxide laser, each of the reflection surfaces comprises a layer of silver on a silicon substrate, two surfaces are enhanced with dielectric layers of ZnSe and all three surfaces are protected with ThF coatings, the two enhanced surfaces have S and P reflectivities of 0.998 and 0.993, and the third surface has S and P reflectivities of 0.996 and 0.984 providing a differential reflectivity of about 1% which is enough to preferentially polarize the circulating light.

22. The invention defined in claim 13 including two resonating mirrors and mirror mounting means for mounting the two resonating mirrors in close proximity and on a common base plate opposing said retroreflector assembly to provide optical stability.

* * * * *

UNITED STATES PATENT AND TRADEMARK OFFICE
CERTIFICATE OF CORRECTION

PATENT NO. : 4,751,720
DATED : June 14, 1988
INVENTOR(S) : Dale E. Koop

It is certified that error appears in the above—identified patent and that said Letters Patent is hereby corrected as shown below:

Column 3, line 67, "this" should read -- This --.

Column 5, line 17, delete "The".

Column 5, line 18, delete "enhanced mirrors are protected with thF coatings.".

Column 6, line 17 "controlling the orientation" should read -- controlling orientation --.

Column 6, line 46, "he" should read -- the --.

Column 7, line 29, after "incidence" insert -- of the three reflective surfaces --.

After Attorney, Agent or Firm, "Donald C. Felix" should read -- Donald C. Feix --.

Signed and Sealed this

Eighth Day of November, 1988

*Attest:*

DONALD J. QUIGG

*Attesting Officer*  *Commissioner of Patents and Trademarks*